United States Patent [19]

Ganguly et al.

[11] Patent Number: 5,643,508
[45] Date of Patent: Jul. 1, 1997

[54] PROCESS FOR THE PREPARATION OF NANODIMENSIONAL PARTICLES OF OXIDES AND SULPHIDES OF METALS

[75] Inventors: Parthasarthy Ganguly; Neela Raghunath Pavaskar; Kunjukrishna Pillai Vijayamohanan, all of Pune; Santhi George, Kerala; Prabhat Singh, Pune, all of India

[73] Assignee: Council of Scientific and Industrial Research, New Delhi, India

[21] Appl. No.: 394,675

[22] Filed: Feb. 23, 1995

[51] Int. Cl.$^6$ ............................................. C01B 31/00
[52] U.S. Cl. ............................. 264/29.6; 264/29.1
[58] Field of Search ................................ 264/29.1, 29.6

[56] References Cited

U.S. PATENT DOCUMENTS

| 3,755,193 | 8/1973 | Luft et al. | 502/101 |
| 4,426,368 | 1/1984 | Quella et al. | 423/445 |

FOREIGN PATENT DOCUMENTS

| 04249860 | 9/1992 | Japan. |
| 04249861 | 9/1992 | Japan. |

OTHER PUBLICATIONS

C.N.R. Rao; 1993; p. 95; Chemical Approaches to the Synthesis of Inorganic Materials.
Milinski E., Lucas P., Wang Y.; J. Chem. Phys., 89 (1988) 3435.
Meldrum F.C. et al; Nature, 349 (1991) 684.
Steigerwald et al; J. Am. Chem. Soc., 110 (1988) 3046.
Herron et al; J. Am. Chem. Soc., 112 (1990) 1322.
Phillip Ball; Nature, 349 (1991) 101.
Chemical Society; Chemical Abstract No. 118:9392s.
Chemical Society; Chemical Abstract No. 118:9393t.

*Primary Examiner*—Christopher A. Fiorilla
*Attorney, Agent, or Firm*—Christie, Parker & Hale, LLP

[57] ABSTRACT

A process for the preparation of nanodimensional particles of oxides and sulphides of metals and metal clusters in a carbonaceous matrix. Inorganic salts of metals are thoroughly mixed with one or more of the polymers polyphenylene sulphide, polyphenylene oxide, polyphenylene selenide, polyphenylene telluride and polyacrylonitrile in a solvent mixture. The mixture is dried and pellets are made from the dried mixture by applying compaction loads in the range of 4000 to 8000 and more preferably 5000 to 5500 psi followed by heating at a temperature in the range of 400° to 800° C. in an inert atmosphere. The above pellets are cooled to room temperature slowly.

7 Claims, No Drawings

PROCESS FOR THE PREPARATION OF NANODIMENSIONAL PARTICLES OF OXIDES AND SULPHIDES OF METALS

This is invention relates to a unique method for making stable ultrafine particles of oxides and sulphides of metals in a carbonaceous matrix of varying conductivity. The particles prepared by the process of the invention are materials useful for several potential applications such as graphitic coatings, catalysts, semiconductor-insulator-metal junction devices as well as in the area of electrochemical energy conversion.

At present there are several physicochemical techniques used for making nanoparticles of various materials. (C. N. R. Rao in p.95 of Chemical Approaches to the Synthesis of Inorganic Materials,1993). One of the important and widely employed techniques is gas condensation. In this method the synthesis of nanophase materials is achieved by means of cluster assembly under controlled conditions followed by the in situ consolidation in high vacuum. Reduction in the size of clusters by controlling the reaction environment to prevent aggregation and particle growth is another prominent method where several inorganic materials such as zeolites or inorganic and biological materials are used as a background matrix. [Milinski. E., Lucas P. and Wang Y., J. Chem. Phys., 89(1988)3435; Meldrum F. C. et al., Nature, 349(1991) 684]. Arrested precipitation in structured media is one way to achieve dispersion control so that nanodimensional particles can be stabilized in the given media. Such a precipitation is usually carried out from organometallic reagents in solution with the particles being protected by a polymeric reagent. [Steigerwald et al. J. Am. Chem. Soc., 110(1988) 3046]. Another way is by diffusion controlled chemical reaction in soft matter containing components of the desired end product and this has been used for making nanoparticles for CdS and Pd. [Herron et al, J. Am. Chem. Soc., 112 (1990) 1322; Phillip Ball, Nature, 349(1991)101]. Polymeric materials so far used to this end include phenolic resins and various copolymers of styrenes [J. P. No. 04,249, 860 filed on 04, Sep. 1992; 04,249,861 filed on Sep. 1992; Chemical abstract Nos, 118:9392s and 118:93931 respectively.

Presently, the following method are more often employed for producing ultrafine particles;

a) Electric arc discharge
b) Control of solubility using sol-gel technique

These conventional methods suffer from various drawbacks. First, these methods are useful only for some classes of materials. Although arc discharge technique has been successfully employed to produce nanodimensional $Al_2O_3$ and $TiO_2$ particles, the process requires high voltages and complicated experimental set-ups. Furthermore, it is very difficult to prevent agglomeration as the particle-gas or particle —is interface cannot effectively form an electrical double layer and in situ consolidation under high vacuum conditions are often required to prevent grain growth. More importantly, high temperatures and high pressures are essential which produces molecules at excited states (with higher grain boundary energy) and therefore, under such experimental conditions controlling the size of particles is very difficult. Other wet methods involving the use of organometallic reagents to form gelled intermediates (the so called sol-gel method) generate ultrafine particles but cause a slow growth in particle size due to aging (Ostwald ripening) leading to a change in distribution even if nanodimensional particles are obtained during the preparation.

One of the important approaches for synthesizing very fine particles (10–50 angstroms) is by controlling the reaction environment to prevent aggregation and particle growth. The synthesis of nanometer sized atomic clusters of metals, ceramics and other inorganic compounds under controlled conditions enable the design of several ultrafine materials with improved or unique properties. In most cases attempts are being made to disperse nanoparticles in transparent and insulating matrices mainly because of their potential use in non-linear optics. Earlier, the dispersion of such nanoparticles on inert supports such as alumina and silica have found application as catalysts. The nature of the matrix may be controlled so as to change the cluster properties in a desired manner through interaction with the surface. Furthermore, sintering, agglomeration, Ostwald ripening and such related phenomenon of reduction in effective area can also be prevented by dispersing these fine particles in the desired medium [Japanese Patent No. 04,193,715 filed on 13, Jul. 1993]. The large surface area of these clusters as well as the high density of the cluster-matrix grain boundaries make such dispersions of nano-particles useful for several applications.

The primary objective of the present invention is to provide a method for obtaining very fine particles of oxides and sulphides of Cd, Zn, Mo, Fe, Sn, W, Ni, Co metals as well as the clusters of these metals without agglomeration.

Another objective of the present invention is to provide for an easy process for the preparation of ultrafine particles dispersed in a conducting matrix for getting high electrochemical activity. The composition of the matrix may be derived from carbon and hydrogen or also from carbon, hydrogen and sulphur. The nano-dimensional particles to be dispersed are the sulphides of the d block elements from the periodic Table, II–VI semiconductors including CdS and ZnS, Conducting oxides of the group IV elements including $WO_2$, $MoO_2$, $VO_2$; insulating oxides including $TiO_2$, NiO, CoO and metallic and alloy clusters of Ni, Fe, Co, W, Mo and Y, and C.

The present invention accordingly provides a process for dispersing nanoparticles of metals, sulphides and oxides mainly in a carbonaceous matrix. By changing the preparation conditions, the conductivity of this matrix may be changed from $>10^{-8} S\ cm^{-1}$ to $<10^2 S\ cm^{-1}$. The material may also be obtained as sintered pellets or as film (by spin casting or spraying) or as loose powder.

The carbonaceous matrix may be derived from any one or more polymers having thermal stability in the range of 200°–300° C. in the presence of at least one benzene ring in the monomer unit and presence of one or more elements including S, Se and Te. The polymers failing in the above category are polyphenylene sulphide, polyphenylene oxide, polyphenylene selenide, polyphenylene telluride and polyacrylonitrile.

The method of preparing the nanoparticles of metallic oxides or sulphides mainly consists of heating the corresponding metallic salts with polyphenylene sulphide (PPS) under various environments. The desired sulphides are dispersed in nanodimensions in a carbonaceous matrix mentioned above. Thus it has been possible to achieve stabilization of above mentioned sulphides and oxides with less than 20 nm radius, dispersed uniformly in the carbonaceous matrix. A representative example of CdS is shown in the accompanying photograph (FIG. 1) The ultrafine grain size causes a large fraction of their atoms to reside in grain boundaries or interfaces and hence the properties are expected to be strongly influenced by the nature of their internal boundaries. More importantly, the same method can be used for stabilizing nanodimensional particles of a variety of transition metal oxides and chalcogenides by changing the nature of the metal salts. Furthermore, the properties of the carbonaceous matrix obtained by the pyrolysis of above mentioned polymers have several unique characteristics making it amenable for these composite materials to be useful in electrochemical energy conversion and storage. The sulphur in the matrix may be removed in some cases, if necessary, by heat treatment with hydrogen as described in examples.

The process for the preparation of the nano-dimensional materials involve:

(i) Thorough mixing of the inorganic precursor of the desired materials with PPS to get a uniform dispersion for 2–3 hours, (ii) making of the suitable pellets under appropriate pressure as described in specific examples, (iii) heating these pellets in an inert environment at high temperatures required for the respective solid state reactions and (iv) annealing the above pellets at suitable cooling rates.

The process of the present invention is explained in details in the following examples which are given by way of illustration only and therelitre should not be construed to limit the scope of the present invention in any manner.

EXAMPLE 1

2.2 gms of Analar grade cadmium bromide was mixed thoroughly with 2.16 gms of PPS (Rayton V-1, manufactured by Phillips Petroleum Co. Ltd., with average degree of polymerization about 170) in a 1:2 molar ratio using a pestle and mortar with the help of a solvent. After drying for 10 minutes under an infra-red lamp, this physical mixture was then pressed into pellets by the application of a compaction load of 5500 psi. These pellets were then heated a in nitrogen atmosphere at a temperature of 600° C. for 20 minutes followed by slow cooling to room temperature. The furnace was thoroughly purged with oxygen-free nitrogen before the heating was commenced. X-ray diffraction and Energy dispersive analysis have confirmed the presence of isolated fine particles of CdS as shown in the micrograph accompanying this text.

EXAMPLE 2

1.96 gm of Analar grade ammonium molybdate was mixed with 1.08 gm of PPS in the molar ratio of 1:1 in a mortar and pestle using acetone. After complete drying this physical mixture was subsequently compacted to form pellets of 8 mm diameter and 3 mm thickness under a load of 4000 psi. These pellets were then heated in a nitrogen atmosphere at 650° C. for two hours followed by slow cooling to room temperature. The product was found to be $MoO_2$ embedded in a highly conducting (few ohm cm) carbonaceous matrix.

EXAMPLE 3

1.87 gms of nickel oxalate were mixed thoroughly with 1.08 gms of polyphenylene sulphide in benzene solvent for nearly 2 hours. Appropriate pellets were made and heated at 700° C. for 2 hours in an argon atmosphere followed by slow cooling in the same environment. Ultrafine particles (20–200 angstroms) particles of nickel oxide were obtained in a carbonaceous matrix, which was confirmed by X-ray diffraction and electron microscopy.

EXAMPLE 4

2.4 gms of nickel chloride was blended completely with a mixture of 0.5 gms of polyacrylonitrile and 0.58 gms of polyphenylene sulphide in a wet condition using ethanol as a solvent for nearly two hours. This mixture was then pressed into pellets of 8 mm diameter by applying a 6000 psi compaction load and these pellets were heated to 600° C. for 3 hours in an inert atmosphere followed by slow cooling in nitrogen. Nanoparticles of nickel sulphide in the range of 25 to 80 nm were obtained

EXAMPLE 5

1.81 gms of analar grade ammonium molybdate, 0.089 gms of ammonium dihydrogen phosphate and 1.08 gms of polyphenelene sulphide were mixed thoroughly in a mortar and pestle using a acetone and butenol mixture. After drying the mixture under an infra-red lamp, the pellets were pressed under 6000 to 8000 psi. These pellets were then heated in a nitrogen atmosphere at 450° C. for two hours followed by slow cooling to room temperature. Small particles (80–100 angstroms) of phosphomolybdate were obtained in the carbonaceous matrix.

EXAMPLE 6

2.68 gms of ammonium molybdate (Analar grade) was mixed with 1.08 gms of polyphenelene sulphide thoroughly in a mortar and pestle using acetone. After drying the mixture under an infrared lamp, the pellets were pressed under 5000 to 7000 psi. These pellets were then heated in hydrogen at 700° C. for 5 hours followed by slow cooling to room temperature. Clusters (50°–100° angstroms) of molybdenum metal entrapped in a carbonaceous matrix were obtained.

The process of the present invention has wide applications in the preparation of semiconductor electrodes in electrochemical reactors and in energy conversion devices and offers several potential advantages. Firstly, oxide and chalcogenide materials can be prepared over a wide range of conductivity by controlling the ratio of polymer to metallic salt. This is particularly significant for applications where a large current is required to pass through the material with minimum ohmic drop. Such applications range from inert $TiO_2$ anodes sustaining high current density for electrosynthesis to lithium battery cathodes specially designed for high rate applications. Secondly, the ultrafine sizes of the atomic clusters with high density of grain boundaries allow conventional restrictions of phase equilibria and kinetics to be overcome during material synthesis. This is possible due to the combination of several factors such as short diffusional lengths, high driving forces and change in electronic energy levels with cluster size and high electrocatalytic activity can be expected atleast for some of these oxides. In addition, the inert graphitic matrix can act as a light weight, nonreactive medium to increase the gravimetric energy density for battery electrode applications. Perhaps the most important advantage of the present method is that it offers a high degree of surface roughness, which is likely to enhance the efficiency and utilization of any energy storage device. The large fraction of atoms residing on the grain boundaries may cause interface atomic arrangements responsible for high electrochemical activity; stability, cost-effectiveness, uniform distribution of fine particles, and flexibility to make different oxides with control over their conductivity.

I claim:

1. A process for the preparation of pellets comprising nanodimensional particles of oxides and sulphides of metals in a carbonaceous matrix comprising the steps of:

(a) thoroughly mixing inorganic salts of metals with one or more polymers selected from the group consisting of polyphenylene sulphide, polyphenylene oxide, polyphenylene selenide, polyphenylene telluride and polyacrylonitrile in a solvent mixture comprising one or more solvents selected from the group consisting of acetone, water, ethanol, butanol, isopropanol, benzene and cyclohexane to form a mixture;

(b) drying the mixture to form a dried mixture;

(c) making pellets from the dried mixture by applying compaction loads of between about 4000 and 8000 psi followed by heating at a temperature of between about 400° and 800° C. in an inert atmosphere and (d) cooling the pellets to room temperature slowly.

2. A process as claimed in claim 1 wherein the inorganic salt of the metal is selected from one or more of the group consisting of tartrates, oxalates, halides, nitrates, citrates, fumarates, thiocyanates, and ammonium salts of one or more metals selected from the group consisting of V, Mo, Cd, Li, Na, K, Y, Ni, W, Ba, Ti and Sn.

3. A process as claimed in claim 2 wherein the inert atmosphere comprises one or more gases selected from the group consisting of nitrogen, argon and helium.

4. A process as claimed in claim 1 wherein the pellets are formed by applying compaction loads of between about 5000 and 5500 psi.

5. A process for the preparation of pellets comprising nanodimensional particles of oxides of metals in a carbonaceous matrix comprising the steps of:

(a) thoroughly mixing inorganic salts of metals with one or more polymers selected from the group consisting of polyphenylene sulphide, polyphenylene oxide, polyphenylene selenide, polyphenylene telluride and polyacrylonitrile in a solvent mixture comprising one or more solvents selected from the group consisting of acetone, water, ethanol, butanol, isopropanol, benzene and cyclohexane to form a mixture;

(b) drying the mixture to form a dried mixture;

(c) making pellets from the dried mixture by applying compaction loads of between about 4000 and 8000 psi followed by heating at a temperature of between about 400° and 800° C. in a hydrogen atmosphere; and (d) cooling the pellets to room temperature slowly.

6. A process as claimed in claim 5 wherein the inorganic salt of the metal is selected from one or more of the group consisting of tartrates, oxalates, halides, nitrates, citrates, fumarates, thiocyanates and ammonium salts of one or more metals selected from the group consisting of V, Mo, Cd, Li, Na, K, Y, Ni, W, Ba, Ti and Sn.

7. A process as claimed in claim 5 wherein the pellets are formed by applying compaction loads of between about 5000 and 5500 psi.

\* \* \* \* \*